United States Patent
Marrero

[11] Patent Number: 5,999,419
[45] Date of Patent: Dec. 7, 1999

[54] NON-ISOLATED BOOST CONVERTER WITH CURRENT STEERING

[75] Inventor: Joe Marrero, Menlo Park, Calif.

[73] Assignee: National Semiconductor Corporation, Santa Clara, Calif.

[21] Appl. No.: 09/131,242

[22] Filed: Aug. 7, 1998

[51] Int. Cl.⁶ .......................... H02M 3/335; G05F 1/656
[52] U.S. Cl. ............................................. 363/21; 323/222
[58] Field of Search ................................. 323/222, 266, 323/269, 270, 273; 363/39, 40, 95, 97, 131

[56] References Cited

U.S. PATENT DOCUMENTS

| | | | |
|---|---|---|---|
| 3,106,672 | 10/1963 | Mills | 320/1 |
| 4,253,139 | 2/1981 | Weiss | 363/95 |
| 4,321,526 | 3/1982 | Weischedel | 323/286 |
| 4,618,919 | 10/1986 | Martin, Jr. | 363/21 |
| 4,692,851 | 9/1987 | Attwood | 363/16 |
| 4,768,141 | 8/1988 | Hubertus et al. | 363/16 |
| 5,038,263 | 8/1991 | Marrero et al. | 363/20 |
| 5,047,911 | 9/1991 | Sperzel et al. | 363/56 |
| 5,107,151 | 4/1992 | Cambier | 307/570 |
| 5,224,025 | 6/1993 | Divan et al. | 363/16 |
| 5,291,382 | 3/1994 | Cohen | 363/16 |
| 5,345,375 | 9/1994 | Mohan | 363/40 |
| 5,502,630 | 3/1996 | Rokhvarg | 323/222 |
| 5,618,404 | 4/1997 | Zak | 363/21 |
| 5,668,464 | 9/1997 | Krein et al. | 323/259 |
| 5,694,302 | 12/1997 | Faulk | 363/16 |
| 5,774,348 | 6/1998 | Druce et al. | 363/60 |
| 5,786,990 | 7/1998 | Marrero | 363/16 |

Primary Examiner—Matthew Nguyen
Attorney, Agent, or Firm—Limbach & Limbach L.L.P.

[57] ABSTRACT

A non-isolated boost converter with input and output current steering. The input current steering is connected across the input switching transistor, is magnetically coupled to the input inductor and conducts the input current when the switch is turned off, thereby reducing ripple in the input current. The output current steering is connected across the diode in the low-pass output filter and is magnetically coupled to the input inductor to generate an induced current for the output filter when the switch is turned on, thereby preventing the output current from pulsating. With the output filter connected across the switch, a boost converter is formed with the output dc voltage being greater than the input dc voltage in relation to the switching duty cycle. With the output filter connected across the input inductor, a buck-boost converter is formed with the output dc voltage being greater than or less than the input dc voltage in relation to the switching duty cycle.

32 Claims, 5 Drawing Sheets

ND-ISOLATED BOOST CONVERTER WITH
CURRENT STEERING

BACKGROUND OF THE INVENTION

1. Field of the Invention

The present invention relates to DC-to-DC voltage converters, and in particular, to boost converters, and more particularly, non-isolated boost converters.

2. Description of the Related Art

Voltage converters which convert one DC voltage to another are increasingly used due to their greater voltage conversion efficiency as compared to linear converters. Such converters are typically used to convert unregulated or regulated DC voltage to a different, and sometimes variable, regulated DC voltage at the output. Such converters are widely used in switch-mode DC power supplies and in DC motor drive applications. One common DC-DC converter topology is a boost converter which converts an input DC voltage to a higher output DC voltage, and is sometimes called a step-up converter.

Referring to FIG. 1, a common boost converter topology includes an input filter capacitor Cin, an input inductor Lin, a metal oxide semiconductor field effect transistor (MOSFET) Msw, a diode Dfw and an output capacitor Co, all interconnected substantially as shown. The input DC voltage Vdc is filtered by the input capacitor Cin and provides an input DC current Iin. This input current Iin, which passes through the input inductor Lin, is periodically switched by the switching transistor Msw in accordance with a switching control signal Vc. The alternating on and off states of the switching transistor Msw define a duty cycle D and in accordance therewith produce a switched current Isw through the switch Msw. (As is well known in the art, the ratio of the output voltage Vo to the input voltage Vdc is equal to the inverse of unity minus the duty cycle D ($1/(1-D)$, where $0<D<1$).)

During steady state operation, when the switch Msw is turned off, the input current Iin flows through the input inductor Lin and freewheeling diode Dfw to form the output current Io which charges the output filter capacitor Co and powers the load Rload. When the switch Msw is turned on, the anode of the diode Dfw is at approximately circuit ground and is reverse-biased by the output voltage Vo across the output capacitor Co and is, therefore, turned off. Meanwhile, the input current Iin now flows through the input inductor Lin and the switch Msw as the switched current Isw to circuit ground.

Referring to FIG. 2, a significant problem with this type of boost converter is that of a pulsating output current Io. Whereas the input current Iin flows regardless of the on or off state of the switch Msw, the output current through the freewheeling diode Dfw only flows during the off state. This pulsating output current Io requires that the output capacitor Co be large enough to handle the ripple current. Additionally, an output filter of some type may be needed for reducing the electromagnetic interference (EMI) generated by the many high-magnitude signal components at the harmonic frequencies ("harmonics") of the pulsed output current Io.

As noted above, the input current Iin is not a pulsating current. However, due to the linear ramping nature of the input current Iin waveform (substantially triangular in shape), the input current Iin still contains a substantial number of harmonics, notwithstanding the low-pass nature of the input circuit formed by the input capacitor Cin and input inductor Lin, and can, therefore, produce EMI at the input terminals.

One technique which has been used in a variety of ways to address the problems of pulsating currents and high harmonic contents is that of ripple steering. The basic principle behind ripple steering is that the input and output ripple currents are steered in such a way as to reduce or substantially eliminate pulsations in the currents, as well as filtering out many of the harmonics of such currents. Examples of ripple steering can be found in U.S. Pat. Nos. 5,038,263 and 5,786,990 (the disclosures of which are incorporated herein by reference).

However, whereas the boost converter topology of FIG. 1 is that of a non-isolated circuit where some form of DC connection exists (at least periodically) between the input and output terminals, the applications involving conventional ripple steering techniques have been in isolated circuit topologies where there is permanent DC isolation between the input and output terminals (e.g., via an isolation transformer). Accordingly, it would be desirable to have some form(s) of ripple steering for non-isolated boost converter topologies.

SUMMARY OF THE INVENTION

A non-isolated boost converter with current steering in accordance with the present invention uses ripple steering techniques in a non-isolated topology to eliminate pulsations in the output current and to reduce the harmonics content of the input current. This advantageously reduces EMI which would otherwise be generated at the input and output terminals of the converter.

In accordance with one embodiment of the present invention, a non-isolated boost converter with input current steering includes an input inductive circuit, a switching circuit, an input current steering circuit and an output filter circuit. The input inductive circuit is configured to receive and conduct an input current at an input dc voltage and in accordance therewith provide an inductive input current. The switching circuit, which is connected to the input inductive circuit, is configured to receive and periodically switch the inductive input current in accordance with alternating on and off states which define a duty cycle. The input current steering circuit, which is connected across the switching circuit and is connected to and magnetically coupled to the input inductive circuit, is configured to receive and conduct a first portion of the inductive input current when the switching circuit is in its off state. The output filter circuit, which is connected across the switching circuit and to the input inductive circuit, is configured to receive and filter a second portion of the inductive input current when the switching circuit is in its off state and in accordance therewith provide an output dc voltage which, in accordance with the duty cycle, is greater than the input dc voltage.

In accordance with another embodiment of the present invention, a non-isolated boost converter with output current steering includes an input inductive circuit, a switching circuit, an output filter circuit and an output current steering circuit. The input inductive circuit is configured to receive and conduct an input current at an input dc voltage and in accordance therewith provide an inductive input current. The switching circuit, which is connected to the input inductive circuit, is configured to receive and periodically switch the inductive input current in accordance with alternating on and off states which define a duty cycle. The output filter circuit, which is connected across the switching circuit and to the input inductive circuit, is configured to receive and filter the inductive input current when the switching circuit is in its off state and an induced current when the switching circuit is in its on state and in accordance therewith provide an output dc voltage which, in accordance with the duty cycle, is greater than the input dc voltage. The output current steering circuit, which is connected across a portion of the output filter circuit and is magnetically coupled to the input inductive circuit, is configured to provide the induced current when the switching circuit is in its on state.

In accordance with still another embodiment of the present invention, a non-isolated boost converter with input and output current steering includes an input inductive circuit, a switching circuit, an input current steering circuit, an output filter circuit and an output current steering circuit. The input inductive circuit is configured to receive and conduct an input current at an input dc voltage and in accordance therewith provide an inductive input current. The switching circuit, which is connected to the input inductive circuit, is configured to receive and periodically switch the inductive input current in accordance with alternating on and off states which define a duty cycle. The input current steering circuit, which is connected across the switching circuit and is connected to and magnetically coupled to the input inductive circuit, is configured to receive and conduct a first portion of the inductive input current when the switching circuit is in its off state. The output filter circuit, which is connected across the switching circuit and to the input inductive circuit, is configured to receive and filter a second portion of the inductive input current when the switching circuit is in its off state and an induced current when the switching circuit is in its on state and in accordance therewith provide an output dc voltage which, in accordance with the duty cycle, is greater than the input dc voltage. The output current steering circuit, which is connected across a portion of the output filter circuit and is magnetically coupled to the input inductive circuit, is configured to provide the induced current when the switching circuit is in its on state.

In accordance with yet another embodiment of the present invention, a non-isolated buck-boost converter with input current steering includes an input inductive circuit, a switching circuit, an input current steering circuit and an output filter circuit. The input inductive circuit is configured to receive and conduct an input current at an input dc voltage and in accordance therewith provide an inductive input current. The switching circuit, which is connected to the input inductive circuit, is configured to receive and periodically switch the inductive input current in accordance with alternating on and off states which define a duty cycle. The input current steering circuit, which is connected across the switching circuit and is connected to and magnetically coupled to the input inductive circuit, is configured to receive and conduct a first portion of the inductive input current when the switching circuit is in its off state. The output filter circuit, which is connected to the switching circuit and across the input inductive circuit, is configured to receive and filter a second portion of the inductive input current when the switching circuit is in its off state and in accordance therewith provide an output dc voltage which, in accordance with the duty cycle, is selectively greater than or less than the input dc voltage.

In accordance with still yet another embodiment of the present invention, a non-isolated buck-boost converter with output current steering includes an input inductive circuit, a switching circuit, an output filter circuit and an output current steering circuit. The input inductive circuit is configured to receive and conduct an input current at an input dc voltage and in accordance therewith provide an inductive input current. The switching circuit, which is connected to the input inductive circuit, is configured to receive and periodically switch the inductive input current in accordance with alternating on and off states which define a duty cycle. The output filter circuit, which is connected to the switching circuit and across the input inductive circuit, is configured to receive and filter the inductive input current when the switching circuit is in its off state and an induced current when the switching circuit is in its on state and in accordance therewith provide an output dc voltage which, in accordance with the duty cycle, is selectively greater than or less than the input dc voltage. The output current steering circuit, which is connected across a portion of the output filter circuit and magnetically coupled to the input inductive circuit, is configured to provide the induced current when the switching circuit is in its on state.

In accordance with yet still another embodiment of the present invention, a non-isolated buck-boost converter with input and output current steering includes an input inductive circuit, a switching circuit, an input current steering circuit, an output filter circuit and an output current steering circuit. The input inductive circuit is configured to receive and conduct an input current at an input dc voltage and in accordance therewith provide an inductive input current. The switching circuit, which is connected to the input inductive circuit, is configured to receive and periodically switch the inductive input current in accordance with alternating on and off states which define a duty cycle. The input current steering circuit, which is connected across the switching circuit and is connected to and magnetically coupled to the input inductive circuit, is configured to receive and conduct a first portion of the inductive input current when the switching circuit is in its off state. The output filter circuit, which is connected to the switching circuit and across the input inductive circuit, is configured to receive and filter a second portion of the inductive input current when the switching circuit is in its off state and an induced current when the switching circuit is in its on state and in accordance therewith provide an output dc voltage which, in accordance with the duty cycle, is selectively greater than or less than the input dc voltage. The output current steering circuit, which is connected across a portion of the output filter circuit and is magnetically coupled to the input inductive circuit, is configured to provide the induced current when the switching circuit is in its on state.

These and other features and advantages of the present invention will be understood upon consideration of the following detailed description of the invention and the accompanying drawings.

DETAILED DESCRIPTION OF THE INVENTION

Figure 1:
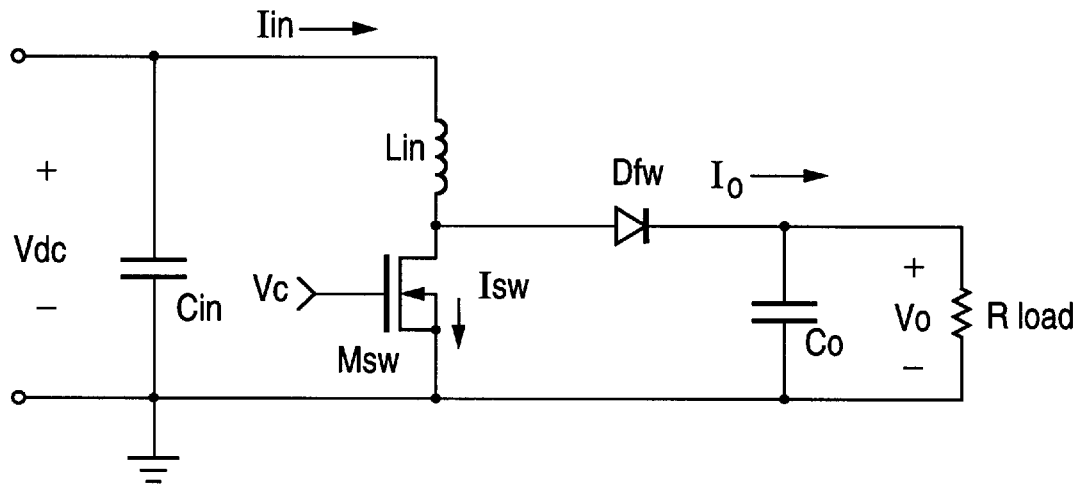
FIG. 1 is a schematic diagram of a conventional boost converter.
Figure 2:
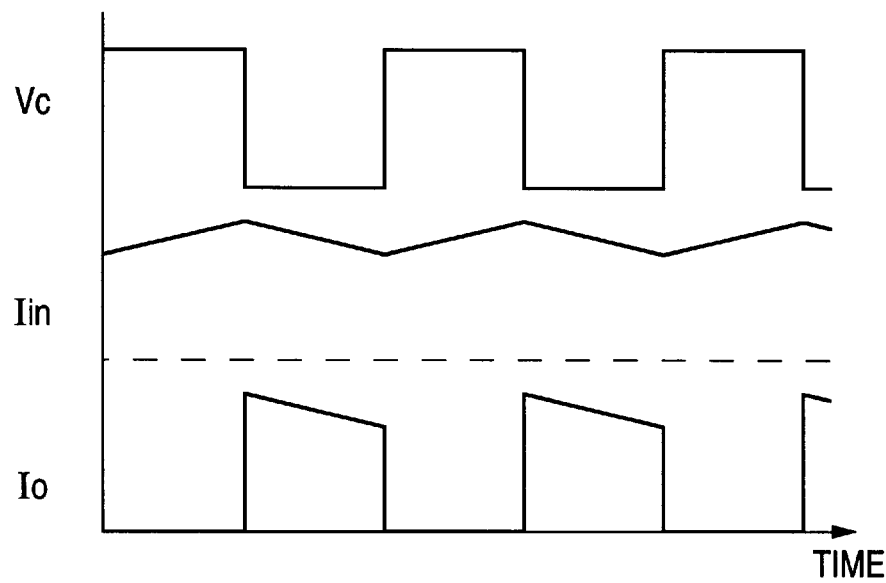
FIG. 2 illustrates voltage and current waveforms (not to scale) for the circuit of FIG. 1.
Figure 3:
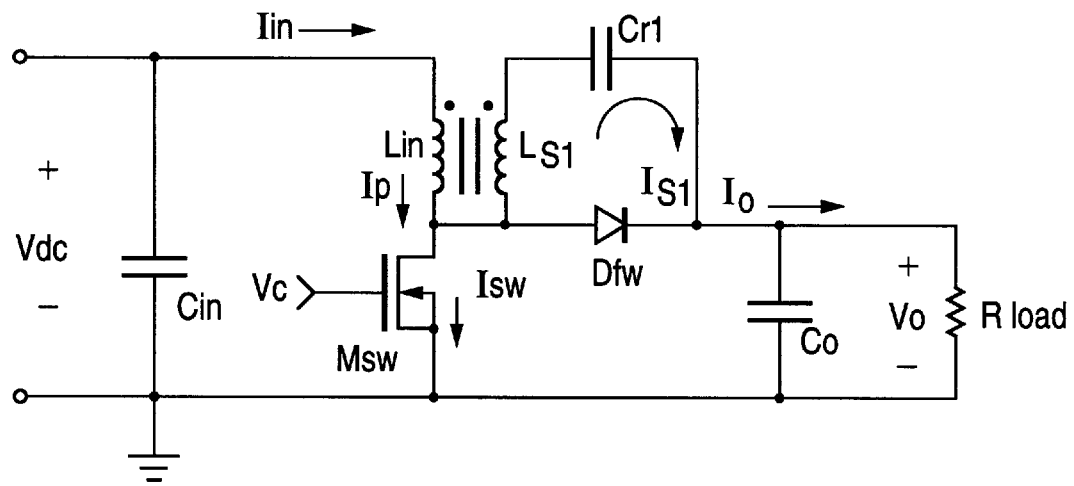
FIG. 3 is a schematic diagram of a boost converter with output current steering in accordance with one embodiment of the present invention.

Referring to FIG. 3, a boost converter with output current steering in accordance with one embodiment of the present invention builds upon the conventional boost converter topology by adding output current steering in the form of a coupling capacitor Cr1 and an output inductor Ls1 which is magnetically coupled to the input inductor Lin. These current steering components Ls1, Cr1 are connected in series across the freewheeling diode Dfw.

During the off state of the switch Msw, the circuit operates in a substantially conventional manner by directing the input current Iin to the output via the freewheeling diode Dfw as the output current Io. During the on state of the switch Msw, the circuit also operates in a substantially conventional manner inasmuch as it conducts the input current Iin through the input inductor Lin and switching transistor Msw. However, due to the magnetic coupling of the output inductor Ls1 to the input inductor Lin, an induced output current Is1 is generated in the output inductor Ls1 and coupled to the output by the coupling capacitor Cr1. Hence, this induced current Is1 maintains current flow to the output during the on state of the switch Msw. Any residual DC current flowing through the inductor Ls1 or DC voltage remaining across the capacitor Cr1 is discharged by the freewheeling diode Dfw when it is turned on during the off state of the switch Msw. (It should be understood that a switching device other than a MOSFET can also be used as the switching transistor Msw, such as a bipolar junction transistor.)

Figure 4:
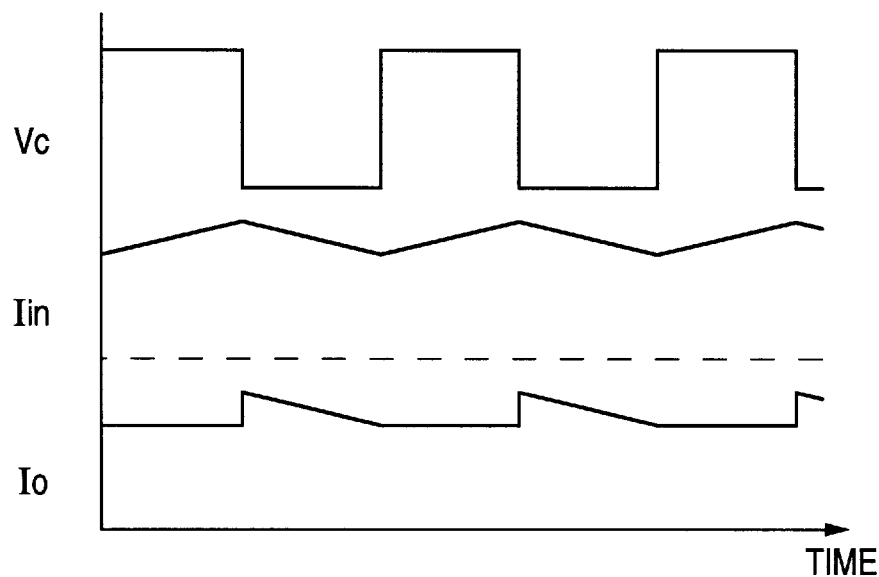
FIG. 4 illustrates voltage and current waveforms (not to scale) for the circuit of FIG. 3.

Referring to FIG. 4, the use of this output current steering circuit Ls1, Cr1 advantageously eliminates the pulsations in the output current Io by maintaining output current flow during the on state of the switching transistor Msw. Accordingly, EMI at the output terminals is significantly reduced.

Figure 5:
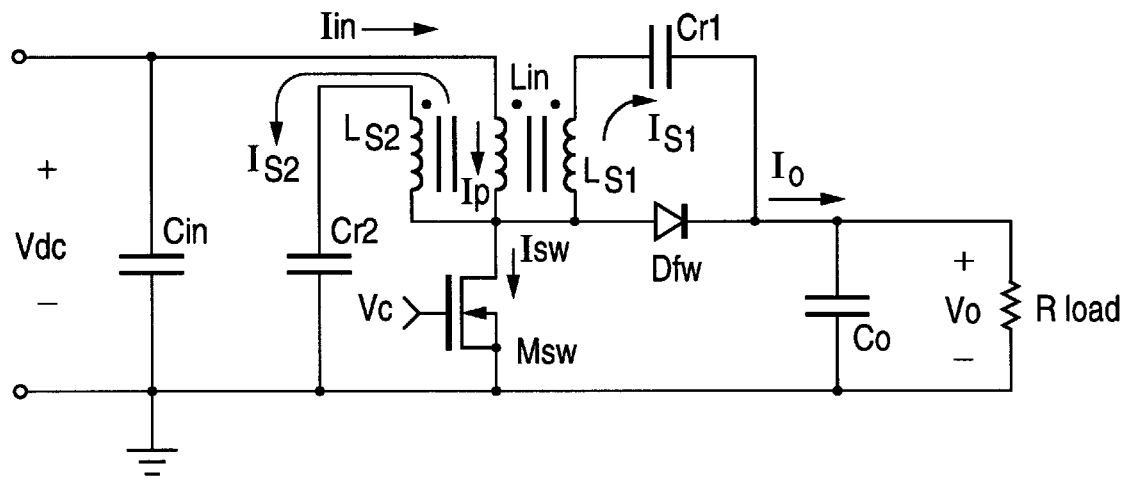
FIG. 5 is a schematic diagram of a boost converter with input and output current steering in accordance with another embodiment of the present invention.

Referring to FIG. 5, in addition to the output current steering circuit Ls1, Cr1, an input current steering circuit Ls2, Cr2 can be added for helping to filter the input current Iin and thereby reduce its harmonics content. This input current steering circuit includes an inductor Ls2 and capacitor Cr2 connected in series across the switching transistor Msw. The inductor Ls2 is also magnetically coupled to the input inductor Lin.

During the on state of the switch Msw, the circuit operates in a substantially conventional manner by conducting the input current Iin through the input inductor Lin and switching transistor Msw. As discussed above, an induced output current Is1 is generated which maintains current flow to the load Rload. During the off state of the switch Msw, the input current Ip flowing out from the input inductor Lin has two possible conduction paths: freewheeling diode Dfw to the output capacitor Co and load Rload; and the input current steering circuit Ls2, Cr2 to circuit ground.

Figure 6:
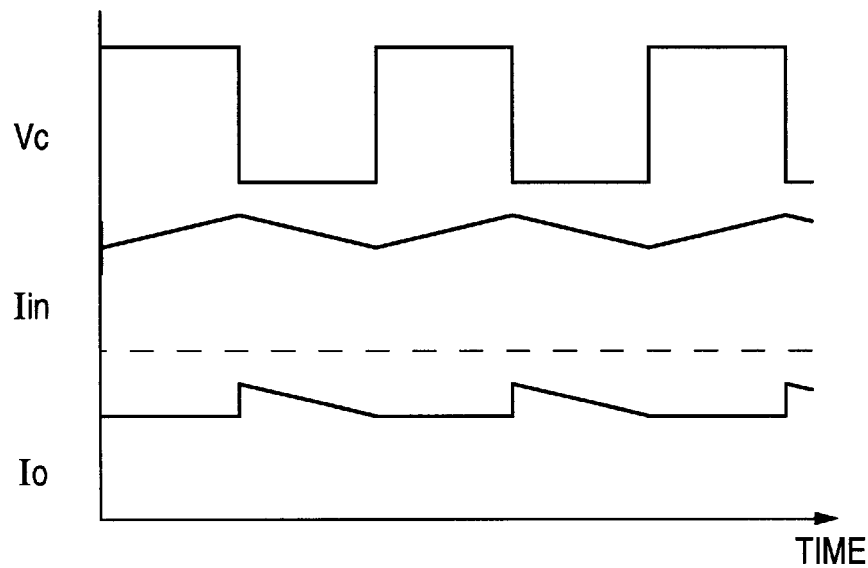
FIG. 6 illustrates voltage and current waveforms (not to scale) for the circuit of FIG. 5.

Referring to FIG. 6, the use of this input current steering circuit Ls2, Cr2 advantageously shunts the higher frequency components of the input current In to circuit ground, thereby reducing the ripple and harmonics content of the input current Iin. Accordingly, the input current Iin now has a waveform which is substantially sinusoidal in shape and has a reduced amplitude as compared to the original triangular ripple waveform (FIG. 4). Accordingly, potential EMI at the input is significantly reduced.

Figure 7:
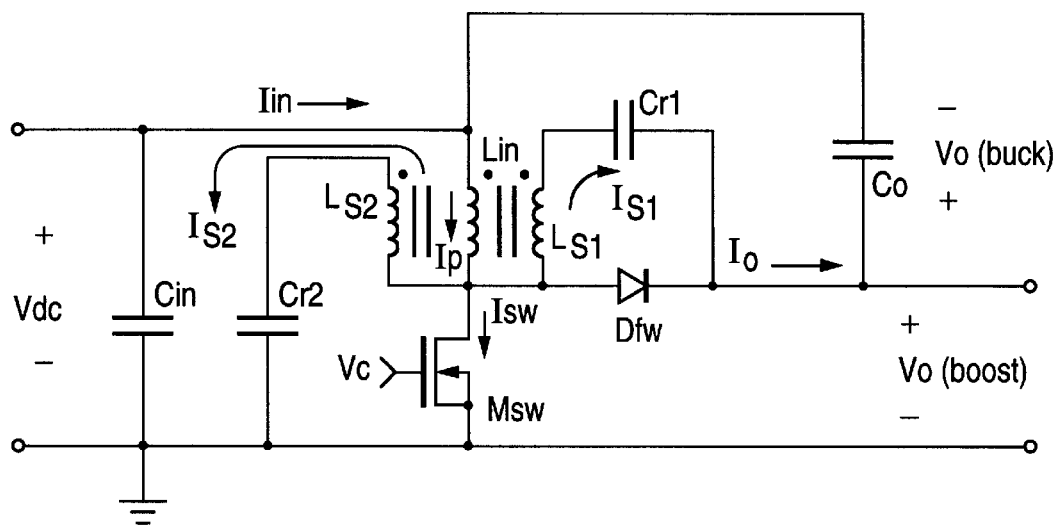
FIG. 7 is a schematic diagram of a buck-boost converter with input and output current steering in accordance with still another embodiment of the present invention.

Referring to FIG. 7, a buck-boost converter in accordance with another embodiment of the present invention can be implemented by slightly modifying the topology of the circuits of FIGS. 3 and 5. By connecting the output filter capacitor Co across the input inductor Lin instead of across the switching transistor Msw, a buck-boost converter can be implemented. By taking the output voltage Vo at the cathode of the diode Dfw relative to circuit ground, a boost converter is formed. However, by taking the output voltage Vo across the output capacitor Co (e.g., using some form of isolation circuitry to isolate the ground of the converter circuit from the ground of the load), a buck converter is formed. (As is well known in the art, the ratio of the output voltage Vo to the input voltage Vdc in a buck converter is equal to the duty cycle D.)

Figure 8:
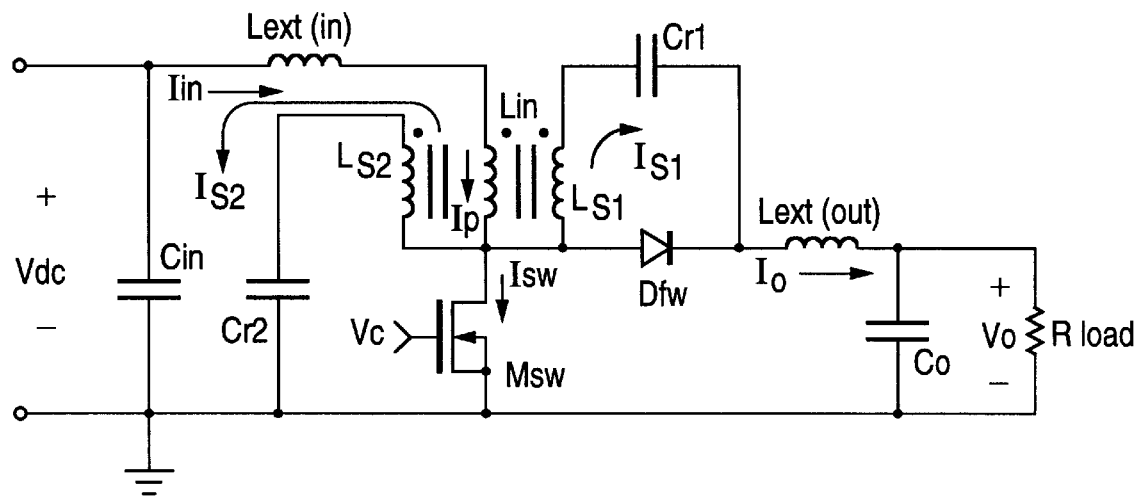
FIG. 8 is a schematic diagram of a boost converter with input and output current steering in accordance with yet another embodiment of the present invention.
Figure 9:
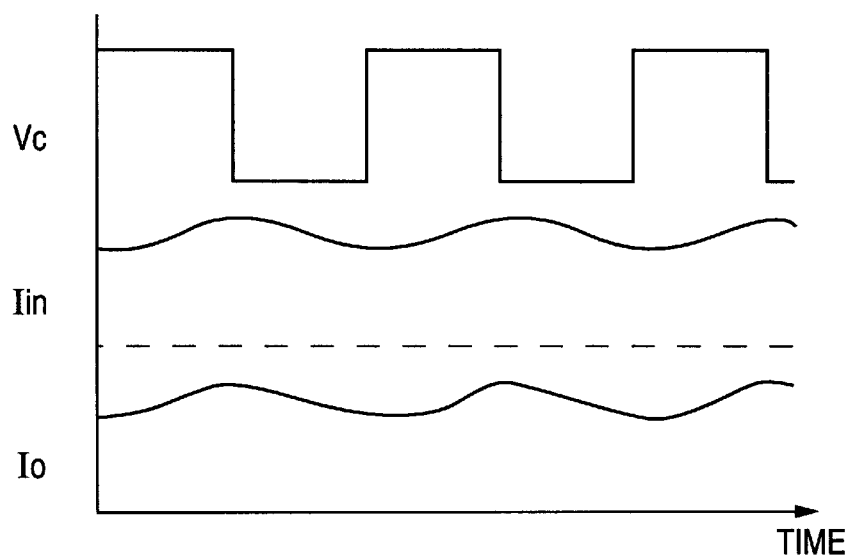
FIG. 9 illustrates voltage and current waveforms (not to scale) for the circuit of FIG. 8.

As should be readily understood by one of ordinary skill in the art, with respect to all of the above-discussed embodiments (including the circuit of FIG. 7), an additional external inductor Lext(out) can be used to provide supplemental filtering of the output current Io between the cathode of the diode Dfw and the output capacitor Co, as shown in FIG. 8. Further, an additional external inductance Lext(in) can be added on the input side between the input capacitor Cin and input inductor Lin. Such additional external inductors Lext (in), Lext(out) would typically have approximately $\frac{1}{20}$ to $\frac{1}{10}$ of the inductance of the input inductor Lin and would further reduce the harmonic contents of the input current Iin and output current Io, both now substantially sinusoidal in shape, thereby resulting in further reduced ripple (peak-to-peak) in such currents Iin, Io. Further, such external inductors Lext (in), Lext(out) help to swamp out small secondary circuit parasitics, such as the equivalent series resistance (ESR) of the filter capacitors Cin, Co and the winding resistances of the various other inductors Lin, Ls1, Ls2.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a non-isolated boost converter with input current steering, comprising:
   an input inductive circuit configured to receive and conduct an input current at an input dc voltage and in accordance therewith provide an inductive input current;
   a switching circuit, connected to said input inductive circuit, configured to receive and periodically switch said inductive input current in accordance with alternating on and off states which define a duty cycle;
   an input current steering circuit, connected across said switching circuit and connected to and magnetically coupled to said input inductive circuit, configured to receive and conduct a first portion of said inductive input current when said switching circuit is in said off state; and an output filter circuit, connected across said switching circuit and to said input inductive circuit, configured to receive and filter a second portion of said inductive input current when said switching circuit is in said off state and in accordance therewith provide an output dc voltage which, in accordance with said duty cycle, is greater than said input dc voltage.

2. The apparatus of claim 1, wherein said input inductive circuit comprises an inductor.

3. The apparatus of claim 1, wherein said switching circuit comprises a metal oxide semiconductor field effect transistor.

4. The apparatus of claim 1, wherein said input current steering circuit comprises a capacitor and an inductor connected in series.

5. The apparatus of claim 1, wherein said output filter circuit comprises a diode and a capacitor connected in series.

6. An apparatus including a non-isolated boost converter with output current steering, comprising:

an input inductive circuit configured to receive and conduct an input current at an input dc voltage and in accordance therewith provide an inductive input current;

a switching circuit, connected to said input inductive circuit, configured to receive and periodically switch said inductive input current in accordance with alternating on and off states which define a duty cycle;

an output filter circuit, connected across said switching circuit and to said input inductive circuit, configured to receive and filter said inductive input current when said switching circuit is in said off state and an induced current when said switching circuit is in said on state and in accordance therewith provide an output dc voltage which, in accordance with said duty cycle, is greater than said input dc voltage; and an output current steering circuit, connected across a portion of said output filter circuit and magnetically coupled to said input inductive circuit, configured to provide said induced current when said switching circuit is in said on state.

7. The apparatus of claim 6, wherein said input inductive circuit comprises an inductor.

8. The apparatus of claim 6, wherein said switching circuit comprises a metal oxide semiconductor field effect transistor.

9. The apparatus of claim 6, wherein said output filter circuit comprises a diode and a capacitor connected in series.

10. The apparatus of claim 6, wherein said output current steering circuit comprises a capacitor and an inductor connected in series.

11. An apparatus including a non-isolated boost converter with input and output current steering, comprising:

an input inductive circuit configured to receive and conduct an input current at an input dc voltage and in accordance therewith provide an inductive input current;

a switching circuit, connected to said input inductive circuit, configured to receive and periodically switch said inductive input current in accordance with alternating on and off states which define a duty cycle;

an input current steering circuit, connected across said switching circuit and connected to and magnetically coupled to said input inductive circuit, configured to receive and conduct a first portion of said inductive input current when said switching circuit is in said off state;

an output filter circuit, connected across said switching circuit and to said input inductive circuit, configured to receive and filter a second portion of said inductive input current when said switching circuit is in said off state and an induced current when said switching circuit is in said on state and in accordance therewith provide an output dc voltage which, in accordance with said duty cycle, is greater than said input dc voltage; and an output current steering circuit, connected across a portion of said output filter circuit and magnetically coupled to said input inductive circuit, configured to provide said induced current when said switching circuit is in said on state.

12. The apparatus of claim 11, wherein said input inductive circuit comprises an inductor.

13. The apparatus of claim 11, wherein said switching circuit comprises a metal oxide semiconductor field effect transistor.

14. The apparatus of claim 11, wherein said input current steering circuit comprises a capacitor and an inductor connected in series.

15. The apparatus of claim 11, wherein said output filter circuit comprises a diode and a capacitor connected in series.

16. The apparatus of claim 11, wherein said output current steering circuit comprises a capacitor and an inductor connected in series.

17. An apparatus including a non-isolated buck-boost converter with input current steering, comprising:

an input inductive circuit configured to receive and conduct an input current at an input dc voltage and in accordance therewith provide an inductive input current;

a switching circuit, connected to said input inductive circuit, configured to receive and periodically switch said inductive input current in accordance with alternating on and off states which define a duty cycle;

an input current steering circuit, connected across said switching circuit and connected to and magnetically coupled to said input inductive circuit, configured to receive and conduct a first portion of said inductive input current when said switching circuit is in said off state; and an output filter circuit, connected to said switching circuit and across said input inductive circuit, configured to receive and filter a second portion of said inductive input current when said switching circuit is in said off state and in accordance therewith provide an output dc voltage which, in accordance with said duty cycle, is selectively greater than or less than said input dc voltage.

18. The apparatus of claim 17, wherein said input inductive circuit comprises an inductor.

19. The apparatus of claim 17, wherein said switching circuit comprises a metal oxide semiconductor field effect transistor.

20. The apparatus of claim 17, wherein said input current steering circuit comprises a capacitor and an inductor connected in series.

21. The apparatus of claim 17, wherein said output filter circuit comprises a diode and a capacitor connected in series.

22. An apparatus including a non-isolated buck-boost converter with output current steering, comprising:

an input inductive circuit configured to receive and conduct an input current at an input dc voltage and in accordance therewith provide an inductive input current;

a switching circuit, connected to said input inductive circuit, configured to receive and periodically switch said inductive input current in accordance with alternating on and off states which define a duty cycle;

an output filter circuit, connected to said switching circuit and across said input inductive circuit, configured to receive and filter said inductive input current when said switching circuit is in said off state and an induced current when said switching circuit is in said on state and in accordance therewith provide an output dc voltage which, in accordance with said duty cycle, is selectively greater than or less than said input dc voltage; and an output current steering circuit, connected across a portion of said output filter circuit and magnetically coupled to said input inductive circuit, configured to provide said induced current when said switching circuit is in said on state.

23. The apparatus of claim 22, wherein said input inductive circuit comprises an inductor.

24. The apparatus of claim 22, wherein said switching circuit comprises a metal oxide semiconductor field effect transistor.

25. The apparatus of claim 22, wherein said output filter circuit comprises a diode and a capacitor connected in series.

26. The apparatus of claim 22, wherein said output current steering circuit comprises a capacitor and an inductor connected in series.

27. An apparatus including a non-isolated buck-boost converter with input and output current steering, comprising:

an input inductive circuit configured to receive and conduct an input current at an input dc voltage and in accordance therewith provide an inductive input current;

a switching circuit, connected to said input inductive circuit, configured to receive and periodically switch said inductive input current in accordance with alternating on and off states which define a duty cycle;

an input current steering circuit, connected across said switching circuit and connected to and magnetically coupled to said input inductive circuit, configured to receive and conduct a first portion of said inductive input current when said switching circuit is in said off state;

an output filter circuit, connected to said switching circuit and across said input inductive circuit, configured to receive and filter a second portion of said inductive input current when said switching circuit is in said off state and an induced current when said switching circuit is in said on state and in accordance therewith provide an output dc voltage which, in accordance with said duty cycle, is selectively greater than or less than said input dc voltage; and an output current steering circuit, connected across a portion of said output filter circuit and magnetically coupled to said input inductive circuit, configured to provide said induced current when said switching circuit is in said on state.

28. The apparatus of claim 27, wherein said input inductive circuit comprises an inductor.

29. The apparatus of claim 27, wherein said switching circuit comprises a metal oxide semiconductor field effect transistor.

30. The apparatus of claim 27, wherein said input current steering circuit comprises a capacitor and an inductor connected in series.

31. The apparatus of claim 27, wherein said output filter circuit comprises a diode and a capacitor connected in series.

32. The apparatus of claim 27, wherein said output current steering circuit comprises a capacitor and an inductor connected in series.

* * * * *